United States Patent [19]
Zabel et al.

[11] Patent Number: 5,404,899
[45] Date of Patent: Apr. 11, 1995

[54] CATCHMENT DEVICE FOR MACHINE PARTS AND TOOLS

[76] Inventors: Robert W. Zabel, 4143 Park Ave., Brookfield, Ill. 60513; Dean T. Stahnke, 2227 4th Ave., North Riverside, Ill. 60546

[21] Appl. No.: 273,420
[22] Filed: Jul. 11, 1994
[51] Int. Cl.[6] .................... F16K 43/00; F16K 51/00
[52] U.S. Cl. .................... 137/315; 137/272; 137/296; 137/368
[58] Field of Search ........... 137/15, 272, 296, 312, 137/315, 364, 368, 377, 382; 277/9, DIG. 4

[56] References Cited

U.S. PATENT DOCUMENTS

| | | | |
|---|---|---|---|
| 926,027 | 6/1909 | Smith | 137/296 |
| 1,086,841 | 2/1914 | Mueller | 137/296 |
| 3,583,416 | 6/1971 | Nebesnik | 137/15 |
| 3,811,344 | 5/1974 | Hand | 81/119 |
| 4,073,307 | 2/1978 | Royce | 137/283 |
| 4,313,457 | 2/1982 | Cliff | 137/312 |
| 4,516,593 | 5/1985 | Muto | 137/15 |
| 4,520,852 | 6/1985 | Klein | 137/312 |
| 4,548,224 | 10/1985 | McLaughlin | 137/315 |
| 4,633,896 | 1/1987 | Bainbridge | 137/296 |
| 4,633,899 | 1/1987 | Lord | 137/312 |
| 4,793,387 | 12/1988 | Le Blanc et al. | 137/312 |
| 4,809,734 | 3/1989 | Cliff | 137/312 |
| 5,020,934 | 6/1991 | Floren et al. | 403/306 |
| 5,101,868 | 4/1992 | Balch | 137/312 |
| 5,172,718 | 12/1992 | Thornburgh | 137/312 |

FOREIGN PATENT DOCUMENTS 2807959 9/1978 Germany ............ 137/368

Primary Examiner—George L. Walton
Attorney, Agent, or Firm—Charles E. Cates

[57] ABSTRACT

A single piece hat-shaped catchment device for preventing machine parts and tools from falling into the inaccessible interior of a mechanism during the servicing thereof. The catchment device includes an inner section defining a central hole and a plurality of radially disposed segments, and an outer section defining a stop for limiting the depth to which said inner section can penetrate into the interior of said mechanism. During servicing the device is pushed downwardly over the exposed part of the mechanism to form an annularly disposed catchment trough for machine parts and tools. After servicing has been completed and any dropped parts or tools have been removed from said trough, the device is quickly and easily pulled upwardly off of said exposed part to permit the mechanism to resume normal operation.

26 Claims, 2 Drawing Sheets

CATCHMENT DEVICE FOR MACHINE PARTS AND TOOLS

BACKGROUND OF THE INVENTION

The present invention relates to catchment devices for preventing machine parts and tools from falling into the inaccessible interiors of machines during the servicing thereof, and is directed more particularly to a catchment device for use with fire hydrants.

The servicing of mechanisms such as fire hydrants which are inconvenient to disconnect is ordinarily performed in place. Such servicing is ordinarily performed, without disconnecting the hydrant base from its underground main, by unbolting and removing the hydrant barrel to gain access to the valve stem, seat, etc. During the time that the hydrant is open for servicing, there exists a serious risk that loose bolts, washers, tools, and debris may fall into the open base. Such items can jam the mechanism and cause the hydrant to leak. As a result, prior to the present invention, if the parts or tools could not be retrieved with an extraction tool of some kind, there was no choice but to dig up the hydrant base, disconnect it from its main and remove the dropped items regardless of the cost.

SUMMARY OF THE INVENTION

In accordance with the present invention there is provided a simple and inexpensive catchment device which is adapted for insertion into the exposed interior of a mechanism such as a fire hydrant, and which serves to prevent any machine parts, tools or debris from falling into its inaccessible interior. Any such dropped items are caught and retained until they are ready to be removed at the service person's convenience. When its purpose has been served and the hydrant is ready to be closed, the catchment member is easily removed before the hydrant barrel is reattached.

In accordance with one important feature of the present invention, the catchment device comprises a hat or disc-shaped, single-piece body member, composed of a somewhat flexible elastomeric material such as polypropylene or polyethylene. This body includes a centrally located interior section which defines an opening for clampingly receiving the main valve stem of a hydrant after its barrel has been removed from its base. The body of the catchment device also includes a peripherally located outer section (or brim) which serves as a stop that fixes the depth to which the interior section of the body can penetrate into the interior of the hydrant base. Ordinarily the opening, and the central and peripheral sections of the catchment device will be symmetrical about the central axis of the body member, i.e., form a surface of revolution about that central axis.

In the preferred embodiment of the invention the central section of the catchment device is divided into a plurality of radially disposed segments or fingers. These fingers impart to that central section a flexibility which allows it to be pushed down over the valve stem and the bifurcated attachment sleeve used therewith and then to become gently clamped to the valve stem as the segments come to rest thereagainst in an upwardly bent configuration. As this occurs the peripheral section of the body acts as a stop and as a stabilizer when it comes to rest on the top surface of the hydrant base. Thus, in spite of its thinness and light weight, the catchment device of the invention forms a stable relatively immobile catchment basin which can prevent even relatively heavy machine parts and tools from falling into the interior of the hydrant.

When the servicing of the hydrant is complete, and all dropped parts and tools have been removed from the catchment device, the latter can be quickly and easily removed from the hydrant. This is accomplished by simply pulling up on the peripheral section thereof. As this section is pulled, the radial segments reverse the direction of their flexure and allow the central section of the device to slide over and off of the valve stem and its bifurcated attachment sleeve.

DESCRIPTION OF THE DRAWINGS

Other objects and advantages of the invention will be apparent from the accompanying drawings in which.

DESCRIPTION OF THE PREFERRED EMBODIMENTS

Figure 1:
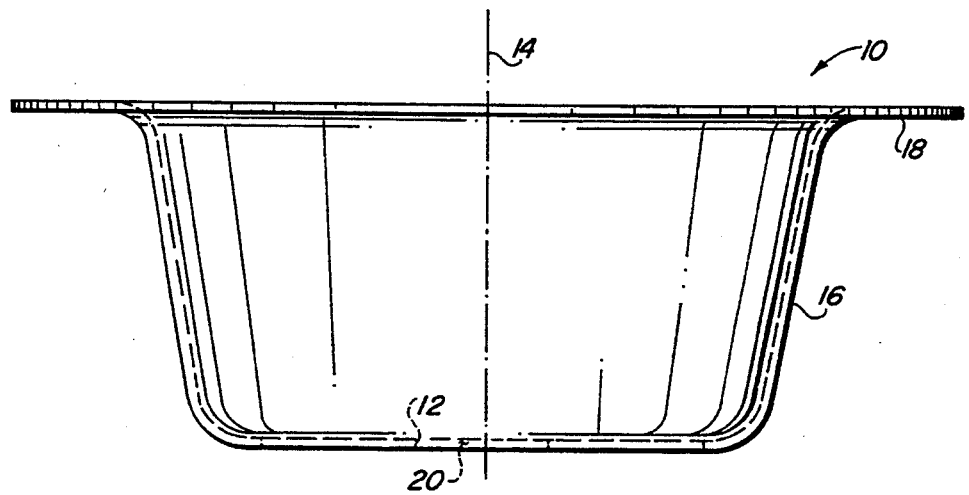
FIG. 1 is a front elevation of the catchment device of the invention.
Figure 2:
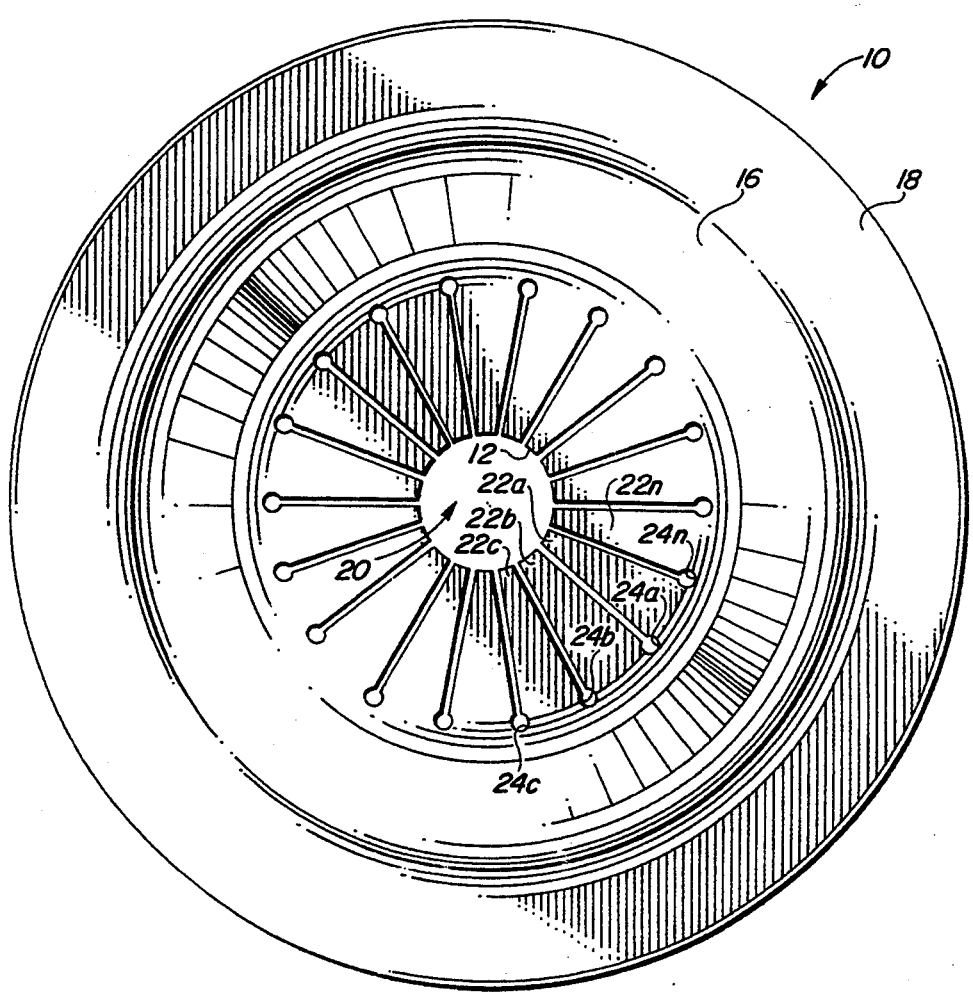
FIG. 2 is a plan view of the catchment device of the invention.

Referring to FIGS. 1 and 2 there are illustrated respective front and top views of a catchment device which has been constructed in accordance with the invention. This device, which preferably has single piece body 10, includes a recessed, generally planar central or interior section 12 that is approximately circular in shape and is oriented perpendicular to central axis 14 of body member 10, an intermediate section 16 that is approximately cylindrical in shape and is oriented roughly parallel to axis 14, and a roughly planar peripheral or outer section 18 that is approximately annular in shape and is oriented perpendicular to central axis 14. Together, these structures give the catchment device an upside down hat shaped appearance with a concave upper surface and a convex lower surface. From this perspective sections 12, 16 and 18 of body 10 correspond to the bottom, side and rim respectively of the hat.

Figure 3:
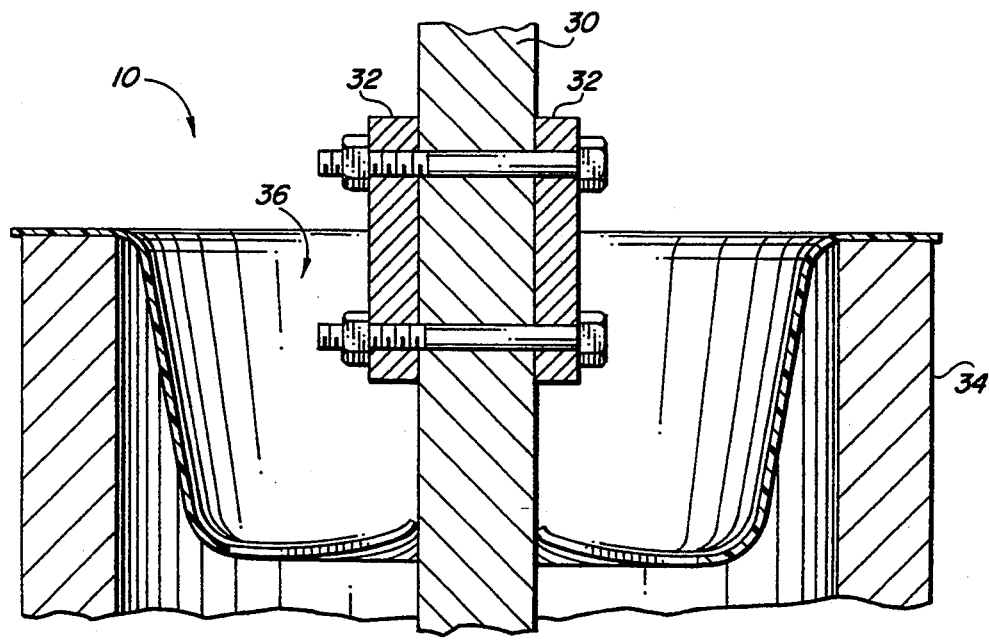
FIG. 3 is a front elevation of the catchment device of the invention shown in combination with the valve stem of a fire hydrant.

In the embodiment of FIGS. 1 and 2 central section 12 defines an central opening 20, best seen in FIG. 2, which preferably has a diameter slightly smaller than that of the valve stem of the hydrant with which it is to be used. As will be explained more fully presently, central opening 20 is so sized and located that body 10 may be pushed down over the valve stem and attachment sleeve of a hydrant from which the barrel has been removed. FIG. 3 shows a cross-sectional view of a catchment device which is in place over a valve stem 30, a sleeve 32 and a hydrant base 34. Once the catchment device is in place, the still-in-place valve stem (which may be termed "exposed-but-not-disassembled" or "undisassembled") and the catchment device together define an annular shaped trough 36 which will catch and trap any small machine parts or tools that are dropped near or above the same. In this way, these parts and tools are prevented from falling into the inaccessible interior of the hydrant.

In accordance with a one important feature of the present invention central section 12 of body 10 is divided into a plurality of segments or fingers 22a, 22b, 22c ... 22n which are defined and bounded by respective pairs of radial slots. In the embodiment of FIG. 2 each of such fingers occupies approximately 20 degrees of arc and, consequently, the total number of fingers is eighteen.

In use, the above mentioned slots allow hole 20 to have a diameter which is somewhat smaller than that of the valve stem that is to be received therein. As a result of this size relationship, as body 10 is pushed down over an undisassembled valve stem, the inner ends of segments 22a–22n flex upwardly and clamp themselves against the valve stem and thereby form a close-fitting engagement therewith, as shown in FIG. 3. This close fit, together with the narrowness of the intersegment slots, assure that not even very small machine parts or tools can fall through body 10 and enter the hydrant base.

In accordance with another important feature of the present invention the length of side section 16 or, equivalently, the height of body 10, is chosen so that it exposes enough of the valve stem of the hydrant that a service person can perform any necessary work thereon. The desired length of exposure is also determined by peripheral or rim section 18 of device 10. This is because rim section 18 serves as a stop which, by being made as large or larger than the hydrant base, limits the depth to which central section 12 of body 10 may penetrate into the hydrant base.

One additional desirable feature of rim section 18 is its ability to cooperate with segments 22a–22n in stabilizing the catchment device. More particularly, as the latter segments clampingly engage the valve stem, rim section 18 comes to rest or seats on the upper surface of the hydrant base, as shown in FIG. 3. Together the central clamping action of central section 10 and the peripheral seating action of rim section 18 assures that the catchment member is strongly and stably supported and, consequently, that it presents little risk that it will dislodge or tip and dump its contents into the interior of the hydrant.

After a service person has completed his servicing of the hydrant and removed any tools or parts dropped into the catchment device, the service person can quickly and easily remove the same by simply pulling it upwardly over and off of the valve stem and sleeve. This is possible because segments 22a–22n thereof are sufficiently flexible that they can snap from an upwardly flexed orientation to a downwardly flexed orientation. After the catchment device has been removed he may reattach the barrel of the hydrant and be confident that no foreign object has been dropped therein.

In order to assure long life and reliable operation, the outer ends of the slots in central section 12 of body 10 are preferably made to terminate in respective rounded openings 24a, 24b, 24c ... 24n. These openings, by releasing some of the stresses induced by the upward and downward flexure of the radial segments, serve to prevent the occurrence of cracks or tears in the material making up body 10.

As previously explained, the catchment device preferably has a single-piece construction. Such construction is desirable because it allows body 10 to be produced simply and inexpensively in a conventional die or injection molding machine. This construction is not, however, essential to the practice of the present invention. Body 10 could, for example, be made with a two-piece structure by cutting inner section 12 from a flat sheet of plastic with a cutting die arranged to simultaneously cut all of its peripheral and interior features, and then attaching the cut piece to the empty interior of a ring-shaped companion piece. Alternatively, central section 12 of body 10 could be replaced by a thin tight fitting elastic sheet with a central hole adapted to stretch and shrink with the entry and egress of the valve stem. It will be understood that these and other alternative structures of a kind that would be apparent to those skilled in the art are within the contemplation of the present invention.

Figure 4:
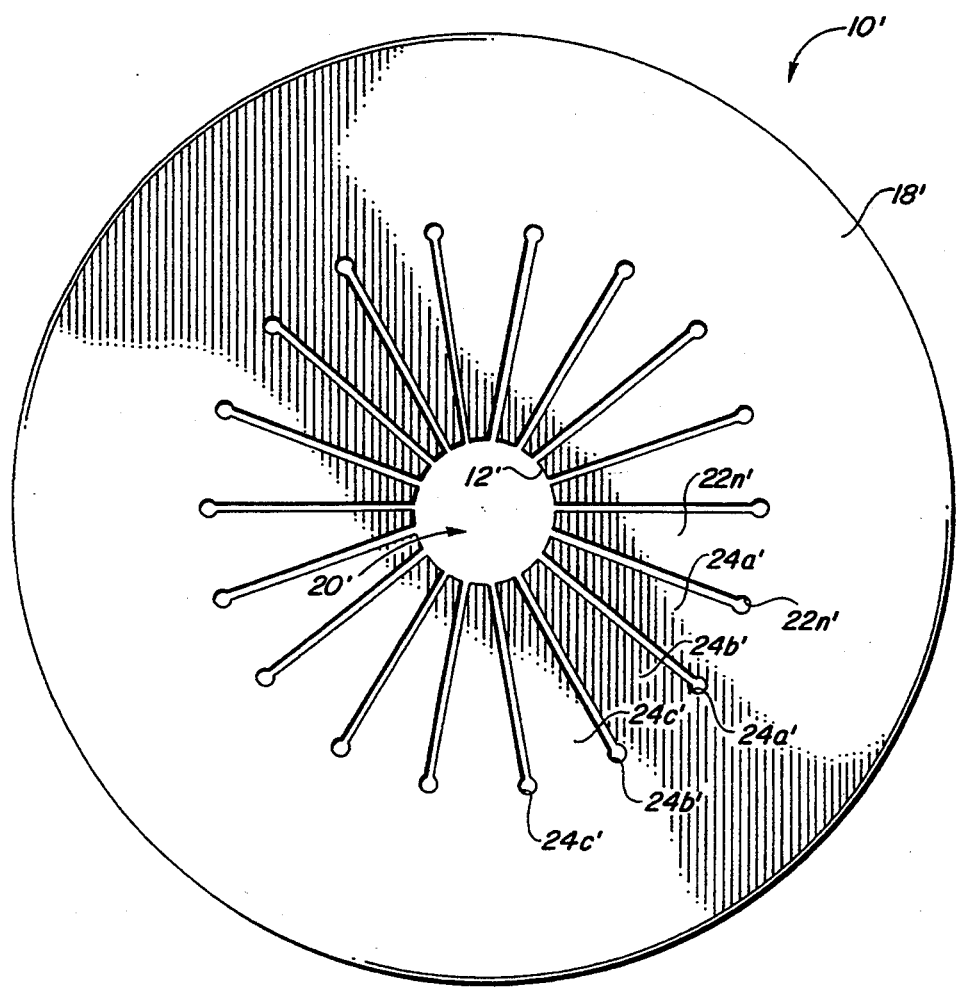
FIG. 4 is a plan view of an alternative embodiment of the invention.

Referring to FIG. 4 there is shown an alternative embodiment of the catchment device of the invention. This embodiment is similar to that shown in FIGS. 1 and 2, like functioning parts being similarly numbered, except that it lacks the hat shape which characterizes the embodiment of FIGS. 1 and 2. More particularly, the embodiment of FIG. 3 includes a generally disc shaped body 10' having a roughly planar central or interior section 12' and a roughly planar peripheral or outer section 18'. The planar character of these sections is not, however, important to the practice of the invention. Inner section 12' may, for example, have a gentle curvature which is either circularly concave or convex, while outer section 18' may have a curvature which is annularly concave or convex, all such curvatures being within the intended meaning of the phrase "roughly planar".

As in the case of the embodiment of FIGS. 1 and 2, the central section 12' of the embodiment of FIG. 4 serves to clampingly engage and disengage the undisassembled valve stem of a fire hydrant while peripheral section 18' thereof serves as a positioner and as a stabilizer for the catchment device. Because these functions have already been described in detail in connection with the embodiment of FIGS. 1 and 2, they will not be discussed further in connection with the embodiment of FIG. 4.

In order to assure the best possible results, the catchment device of the invention is preferably constructed from a sheet of material which has a thickness that meets two criteria. One of these is that the material is sufficiently thick that it can support the weight of any part or tool or combination thereof which could plausibly be dropped thereon during use. Another is that the material is sufficiently thin that it can flex into a close-fitting engagement with the valve stem to make certain that body 10 does not present to any part or tool a gap large enough to allow the same to fall into the interior of the hydrant.

While the catchment device of the invention has been described with reference to its application to a fire hydrant, and is specially adapted for use with a fire hydrant, it is not limited to such an application. It will therefore be understood that the true spirit and scope of the present invention should be determined with reference to the following claims.

What is claimed is:

1. A catchment device for use in preventing machine parts and tools from falling into the inaccessible interior of a mechanism during the servicing thereof, characterized by:

(a) a body composed of a material which is sufficiently stiff to support the weight of machine parts and tools of the kind used during the servicing thereof, and which is sufficiently flexible to clampingly engage a first part of the mechanism;

(b) said body having an inner section which defines an opening for receiving said first part and which clampingly engages said first part when said first part extends through said opening;

(c) said body having an outer section adapted to rest on a second part of the mechanism for stabilizing the position of said inner section when the latter clamingly engages said first part;

(d) whereby machine parts and tools which are dropped during the servicing of the mechanism fall onto said body and not into the inaccessible interior of said mechanism.

2. The catchment device of claim 1 in which said body has a central axis about which said body is generally symmetrical.

3. The catchment device of claim 2 in which said body is generally hat shaped, the inner section of the body being separated from the outer section thereof by an intermediate section which is generally parallel to said central axis.

4. The catchment device of claim 1 in which said body is generally disc shaped, in which the inner and outer sections of the body are roughly planar, and in which the inner and outer sections are coplanar with one another.

5. The catchment device of claim 2 in which said outer section is roughly planar and lies in a plane that is approximately perpendicular to said axis.

6. The catchment device of claim 1 in which said mechanism is a fire hydrant, and in which said first part of the mechanism is a valve stem occupying said opening.

7. The catchment device of claim 1 in which said opening is smaller than said first part and in which said inner section is divided into a plurality of radial segments.

8. The catchment device of claim 1 in which said body is formed in a single piece and is composed of an elastomeric material.

9. A catchment device for use in preventing machine parts and tools from falling into the inaccessible interior of a partly disassembled mechanism during the servicing thereof, characterized by:

(a) a body having an upper surface and a lower surface;

(b) the central portion of said body defining an opening through which a still assembled part of said mechanism may project above said upper surface, during the servicing of said still assembled part, while being clampingly engaged by said body;

(c) the peripheral portion of said body defining a stop adapted to limit the distance which said still assembled part may project above said upper surface;

(d) whereby machine parts and tools which are dropped during the servicing of said mechanism fall onto said body and not into the inaccessible interior of said mechanism.

10. The catchment device of claim 9 in which said body has a central axis about which said body is approximately symmetrical.

11. The catchment device of claim 10 in which said body is generally hat shaped, said central portion of the body being separated from the peripheral portion thereof by an intermediate portion which is generally parallel to said central axis.

12. The catchment device of claim 10 in which said body is generally disc shaped, in which the inner and outer portions are roughly planar, and in which the inner and outer portions are coplanar with one another.

13. The catchment device of claim 10 in which said body defines a plurality of radial slots which divide said central portion into a plurality of flexible segments.

14. The catchment device of claim 13 in which the outer ends of said slots include openings defined by said body for relieving stresses induced by the flexing of said segments.

15. The catchment member of claim 9 in which the size, shape and proportions of said body cause said body to be specially adapted for use during the servicing of a fire hydrant.

16. A catchment device for use in preventing machine parts and tools from falling into the inaccessible interior of a partly disassembled mechanism during the servicing thereof comprising, in combination:

(a) a body member formed of a material that is relatively thin and of approximately constant thickness;

(b) said member having a centrally disposed roughly planar section which defines an opening for admitting a still assembled part of said mechanism during the servicing thereof, and which clampingly engages said still assembled part when said still assembled part extends through said opening;

(c) said member also having a peripherally disposed roughly planar section for holding said planar section relatively immobile during the servicing of said still assembled part;

(d) whereby machine parts and tools which are dropped during the servicing of said still assembled part fall onto said body and not into the inaccessible interior of said mechanism.

17. The catchment device of claim 16 in which said member has a central axis about which said member is approximately symmetrical.

18. The catchment device of claim 16 in which said member is generally hat shaped, said centrally disposed section being separated from said peripherally disposed section by an intermediately disposed section centered on said central axis.

19. The catchment device of claim 16 in which said member is generally disc shaped, and in which said centrally and peripherally disposed sections are both roughly planar.

20. The catchment device of claim 16 in which the size, shape and proportions of said member cause said member to be specially adapted for use during the servicing of a fire hydrant.

21. The catchment device of claim 16 in which said centrally disposed section is divided into a plurality of radially disposed finger-like segments by radial slots defined by said centrally disposed section.

22. The catchment device of claim 21 in which the outer ends of said slots include openings defined by said member for relieving stresses induced by the flexing of said segments.

23. The catchment device of set forth in claim 21 wherein said opening is slightly smaller than said still assembled part, whereby the entry of said part into said opening causes said segments to flex upwardly to form an annularly concave catchment surface surrounding said part.

24. The catchment device of claim 16 in which said member is formed in a single piece and is composed of an elastomeric material.

25. The catchment device of claim 16 further including a still assembled part of said mechanism occupying said opening.

26. The catchment device of claim 25 in which said still assembled part is a part of a fire hydrant.

* * * * *

UNITED STATES PATENT AND TRADEMARK OFFICE
CERTIFICATE OF CORRECTION

PATENT NO. : 5,404,899
DATED : April 11, 1995
INVENTOR(S) : Robert W. Zabel et al It is certified that error appears in the above-identified patent and that said Letters Patent is hereby corrected as shown below:

Claim 1, subsection (c), column 5, line 6, the word "clamingly" should be --clampingly--.

Signed and Sealed this

Sixth Day of June, 1995

*Attest:*

BRUCE LEHMAN

*Attesting Officer*     *Commissioner of Patents and Trademarks*